United States Patent [19]
Mack

[11] Patent Number: 6,028,419
[45] Date of Patent: Feb. 22, 2000

[54] 2.9 TO 5.1 VOLT POWERED, INDUCTORLESS STEP UP DC TO DC CONVERTER

[75] Inventor: Herman Mack, Montvale, Va.

[73] Assignee: ITT Manufacturing Enterprises, Inc., Wilmington, Del.

[21] Appl. No.: 09/168,146

[22] Filed: Oct. 7, 1998

[51] Int. Cl.[7] .......................................................... G05F 1/40

[52] U.S. Cl. .......................................... 323/272; 323/288

[58] Field of Search ..................................... 323/272, 283, 323/288; 363/60

[56] References Cited

U.S. PATENT DOCUMENTS 5,301,097   4/1994   McDaniel ................................... 363/60

*Primary Examiner*—Shawn Riley
*Attorney, Agent, or Firm*—McDermott, Will & Emery

[57] ABSTRACT

A voltage converter for a portable electronic includes a first switching circuit for charging a first capacitor responsively to a first control signal and a second switching circuit for charging a second capacitor responsively to a second control signal. The first and second switching circuits are further adapted to enable charging of the first capacitor to a greater potential than the first switching circuit alone.

20 Claims, 13 Drawing Sheets

2.9 TO 5.1 VOLT POWERED, INDUCTOR-LESS STEP UP DC TO DC CONVERTER

FIELD OF INVENTION

This invention relates to a DC to DC converter and more particularly to a 2.9 to 5.1 volt powered, inductor-less step up, DC to DC converter for cellular telephone products.

BACKGROUND OF INVENTION

Cellular telephone products can typically be powered using a 3.5 volt power supply, i.e. battery, and include a variable transmit power of 2.9 volts to 5.1 volts depending upon the status of the battery for example (i.e. low battery to battery recharge). Power controller circuits must have a power source with a minimum of −3.0 volts even as the system's power supply varies between 2.9 and 5.1 volts. However, as size and power requirements have developed, 4.6 volt battery sources have given way to 3.5 volt battery sources due to size and weight considerations. In order to further reduce size and weight of devices such as cellular phones, it is desirable to eliminate the use of inductive converters.

A device similar to that of the present invention is a three-diode voltage tripler. A three-diode voltage tripler is driven by dual 180° out-of-phase outputs of an astable multivibrator. Such a device provides an output voltage of three times the multi vibrator's peak output minus 3 forward biased diode drops.

A typical problem encountered while attempting to use a three-diode voltage tripler is that its output impedance is more than an order of magnitude higher than what is required to properly source a power amplifier's power controller circuitry. The loading due to the power controller in effect reduces the available negative voltage to an unusable level.

Another device similar to that of the present invention can generally be classified as a charge pump. A charge pump essentially consists of two sets of double pole, double throw, switches with one set having closed contacts and the other set having open contacts. The sets alternate either open or close contacts at the frequency of the driving source which is typically an astable multivibrator.

A charge pump first operates in the charge mode by connecting a capacitor across the power source to be charged and then on the next half cycle disconnects this capacitor from the power source and enters pump mode by connecting the capacitor across a second capacitor and in the process adding a charge to the second capacitor. This ongoing process in time charges the second capacitor to a maximum possible voltage. The first capacitor is then inverted during the switching activity and actually charges the second capacitor to a negative voltage which becomes the supply needed to power the power controller circuitry.

A typical problem encountered when attempting to use a charge pump is that the negative voltage developed is only equivalent to about 65% of the positive supply voltage. This output of 65% would not be a problem if the low battery condition were 4.6 volts instead of 2.9 volts as is typical.

Please note that under the 2.9 volt "low-battery condition" this translates to a negative output of only −1.9 volts.

SUMMARY OF INVENTION

A voltage converter for a portable electronic device including means for providing first and second control signals; first and second capacitive means; first switching means for charging the first capacitive means responsively to the first control signal; and, second switching means for charging the second capacitive means responsively to the second control signal; wherein the first and second switching means are further adapted to enable charging of the first capacitive means to a greater potential than the first switching means alone.

DETAILED DESCRIPTION OF THE INVENTION

In contrast to either of these devices, the present invention makes use of a dual charge pump circuit. The dual charge pumps are wired up and driven with the appropriate phasing in a manner that causes the output voltage of each charge pump to be added together in series thereby providing twice the negative output voltage.

A polarity change takes place during the dual charge pump's switching activity causing the developed output voltage to have negative value with respect to ground.

Figure 1:
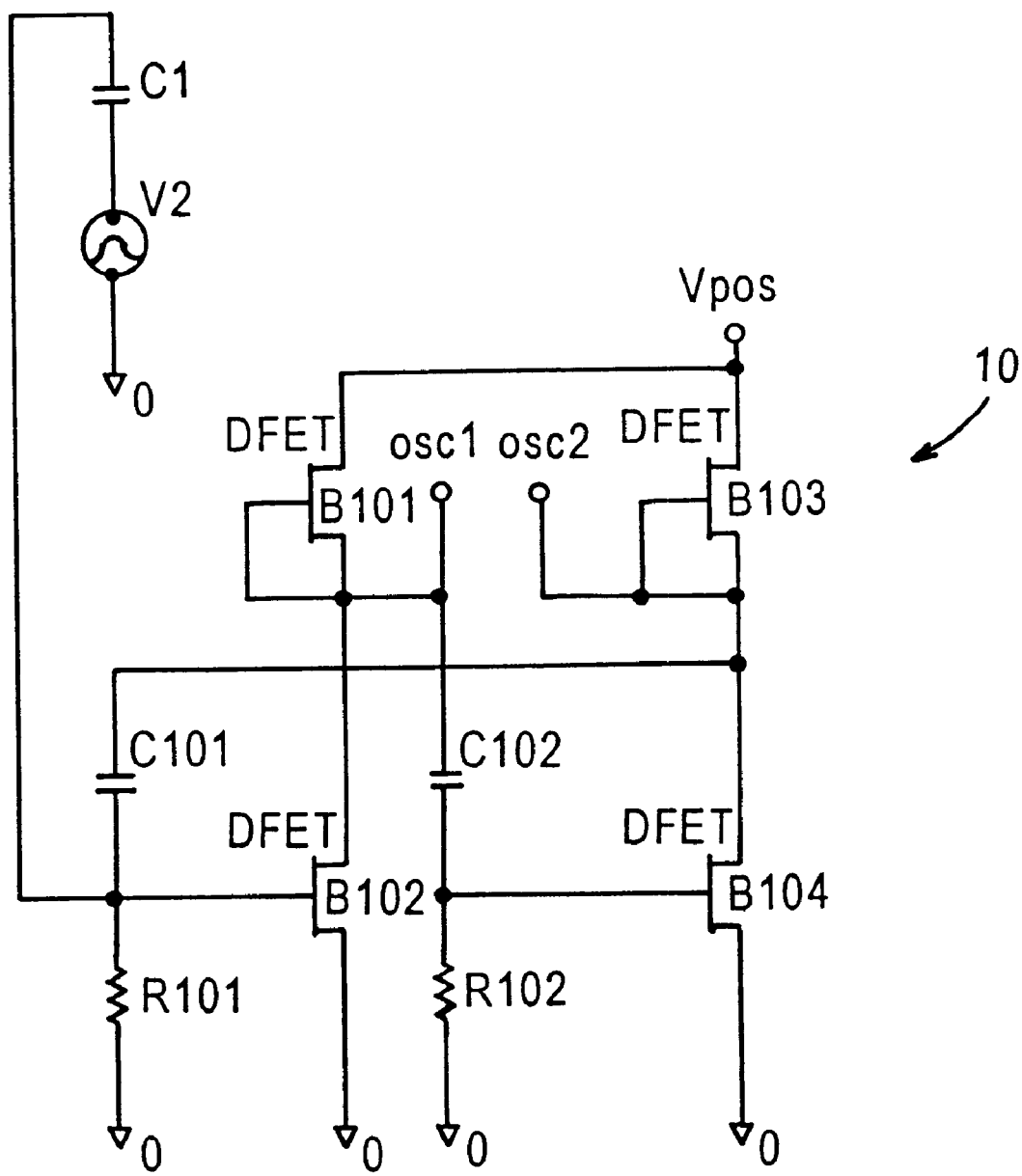
FIG. 1 illustrates an astable multivibrator utilized according to the present invention.

Referring now to the Figures, wherein like references designate like elements of the invention, FIG. 1 illustrates a free-running astable multivibrator 10 utilized according to the present invention. The multivibrator 10 preferably includes two load devices B101 and B103 respectively feeding and AC coupled to two active devices B102 and B104. The multivibrator 10 in turn supplies two respective oscillation signals being 180° out-of-phase with one another at the nodes osc1 and osc2.

In a preferred form, capacitors C101 and C102 are 20 p, resistors R101 and R102 are 88 k and the frequency of oscillation is 200 kHz. Further, a source V2 through a capacitor C1 which preferably has a value of 1 p, provides a startup pulse.

Figure 2:
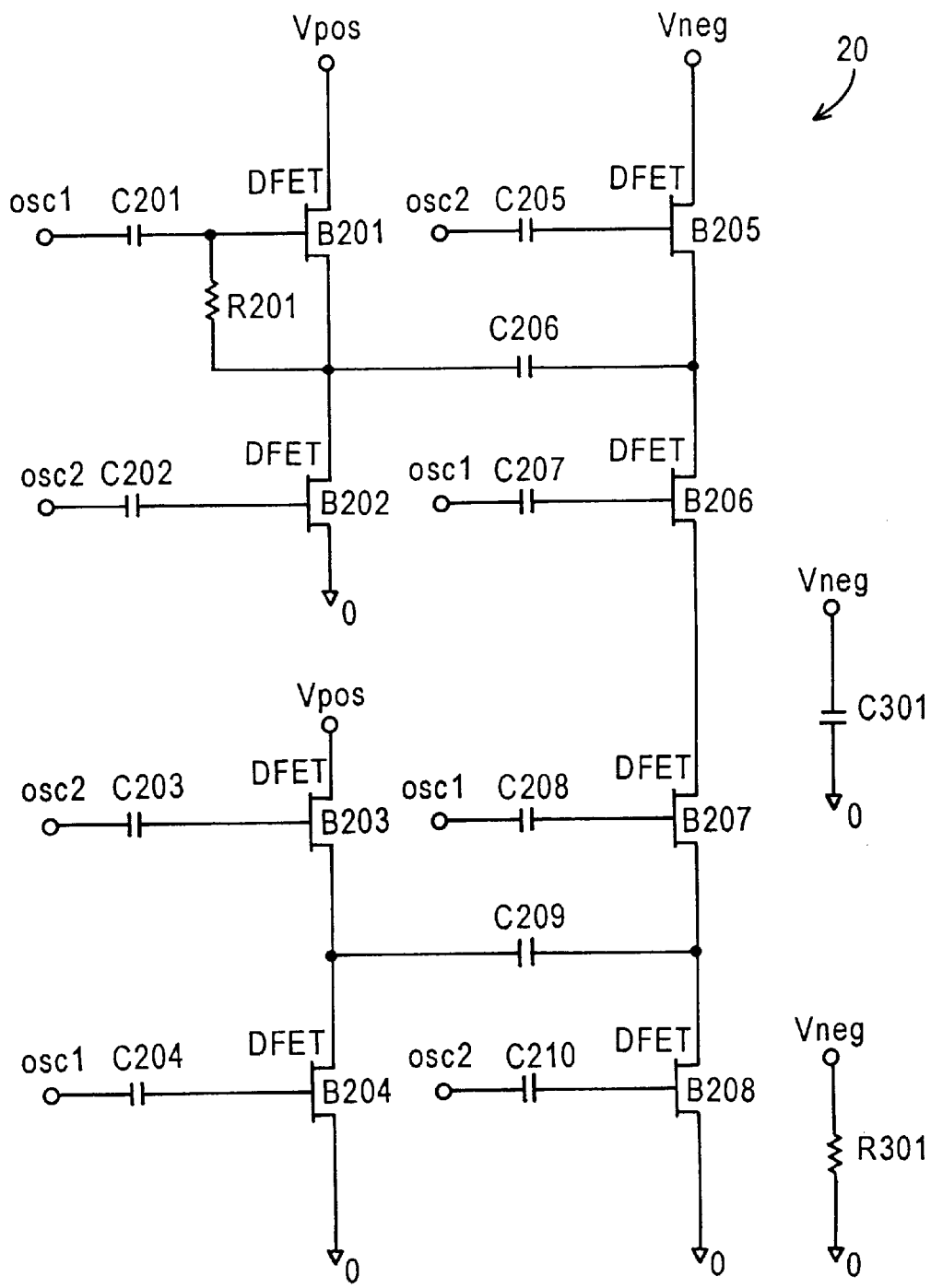
FIG. 2 illustrates a first embodiment of a series aiding dual charge pump utilized according to the present invention.

Referring now to FIG. 2, therein is illustrated a first embodiment of a series connected, series aiding dual charge pump 20 according to the present invention.

Therein, the first oscillation signal provided by the multivibrator 10 (osc1) is supplied to a capacitor C201 which is coupled to the gate of a transistor B201 which has a resistor R201 coupled between the gate and source thereof. The drain of B201 is coupled to a supply voltage, for example the battery of a device in which the present invention has been integrated, such as a cellular phone. The second oscillation signal provided by the multivibrator 10 (osc2) is supplied to a capacitor C202 which is coupled to the gate of a transistor B202 which has a drain coupled to the source of the transistor B201, and a source coupled to a reference potential.

The second oscillation signal provided by the multivibrator 10 (osc2) is further supplied to a capacitor C205 which is coupled to the gate of a transistor B205 which has a drain coupled to a node Vneg in turn coupled in parallel through a load capacitor C301 and resistor R301 to a reference potential. The first oscillation signal provided by the multivibrator 10 (osc1) is further supplied to a capacitor C207 which is coupled to the gate of a transistor B206 having a drain coupled to the source of the transistor B205.

A capacitor C206 is coupled, on a first side to the source of transistor B201 and drain of transistor B202, and on a second side to the source of transistor B205 and drain of transistor B206.

The second oscillation signal provided by the multivibrator 10 (osc2) is further supplied to a capacitor C203 which is coupled to the gate of a transistor B203. The drain of B203 is coupled to a supply voltage, for example the battery of a device in which the present invention has been integrated into, such as a cellular phone. The first oscillation signal provided by the multivibrator 10 (osc1) is further supplied to a capacitor C204 which is coupled to the gate of a transistor B204 which has a drain coupled to the source of the transistor B203, and a source coupled to a reference potential.

The second oscillation signal provided by the multivibrator 10 (osc2) is further supplied to a capacitor C210 which is coupled to the gate of the transistor B208 which has a source coupled to a reference potential. The first oscillation signal provided by the multivibrator 10 (osc1) is further supplied to a capacitor C208 which is coupled to the gate of a transistor B207 having a source coupled to the drain of a transistor B208.

Capacitor C209 is coupled, on a first side to the source of transistor B203 and drain of transistor B204, and on a second side to the source of transistor B207 and drain of transistor B208.

Finally, the source of transistor B206 is coupled to the drain of transistor B207.

Preferably, C201 is 20 p, C202, C203, C204, C205, C207, C208 and C210 are 2 p, C206 and C209 are 100 n, C301 is 330 n, R201 is 100 k and R301 is 3.5 k. Further, transistors B201–B208 have a pinch off voltage of 0.4 volts and are approximately 2.4 mm in size.

In operation, when the signal at osc1 is high, the level at the gates of B201, B206, B207 and B204 is high, and C206 takes a charge. When the signal at osc2 is high, the level at the gates of B205, B202, B203 and B208 becomes high, the charge on C206 is inverted and pumped into the storage capacitor C301, and C209 becomes charged. When osc1 becomes high again, C209 is inserted into the series aiding charge path of C206 causing C206 to be charged to a voltage greater than the positive supply voltage at Vpos.

Figure 3:
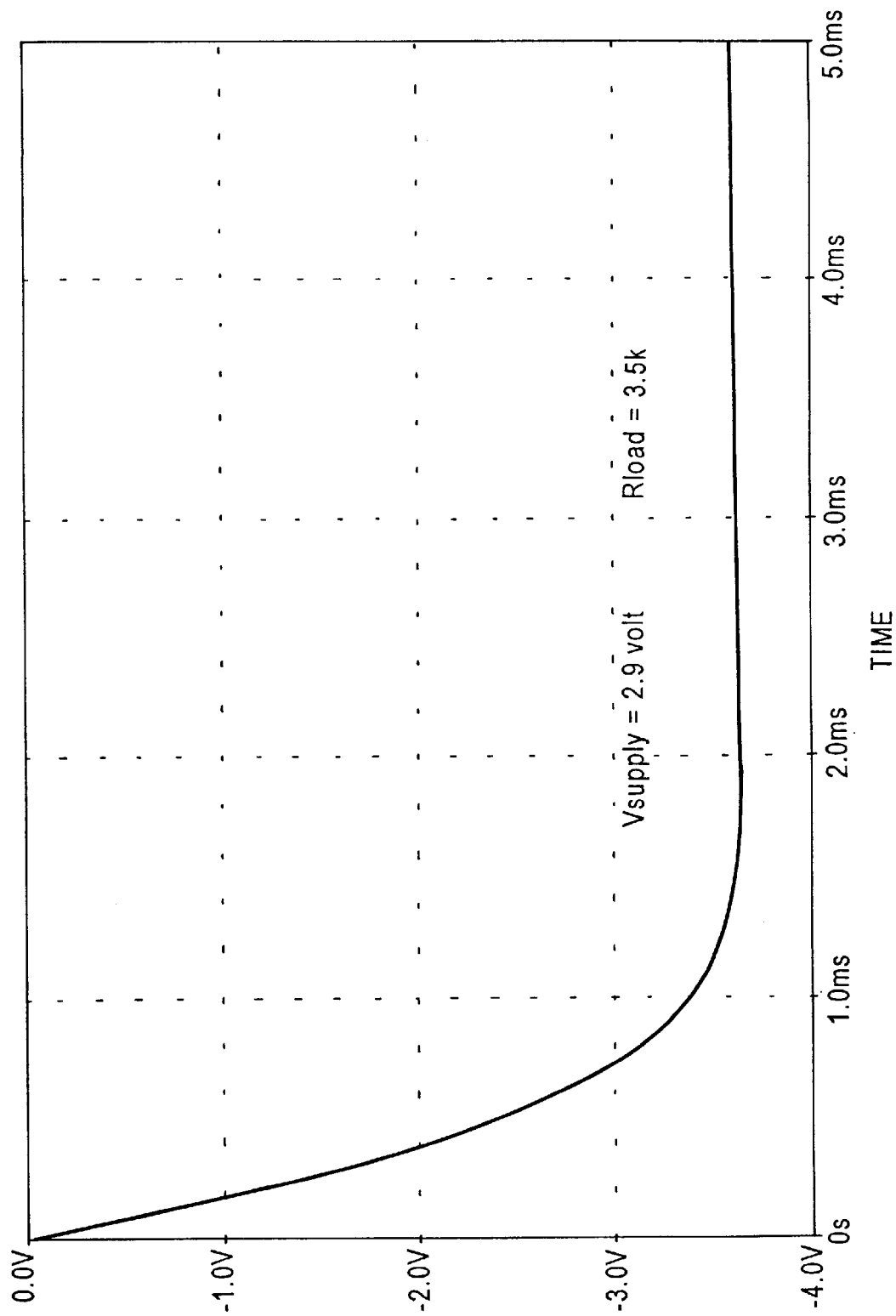
FIG. 3 illustrates the output characteristics of the embodiment of the present invention illustrated in FIG. 2.
Figure 4:
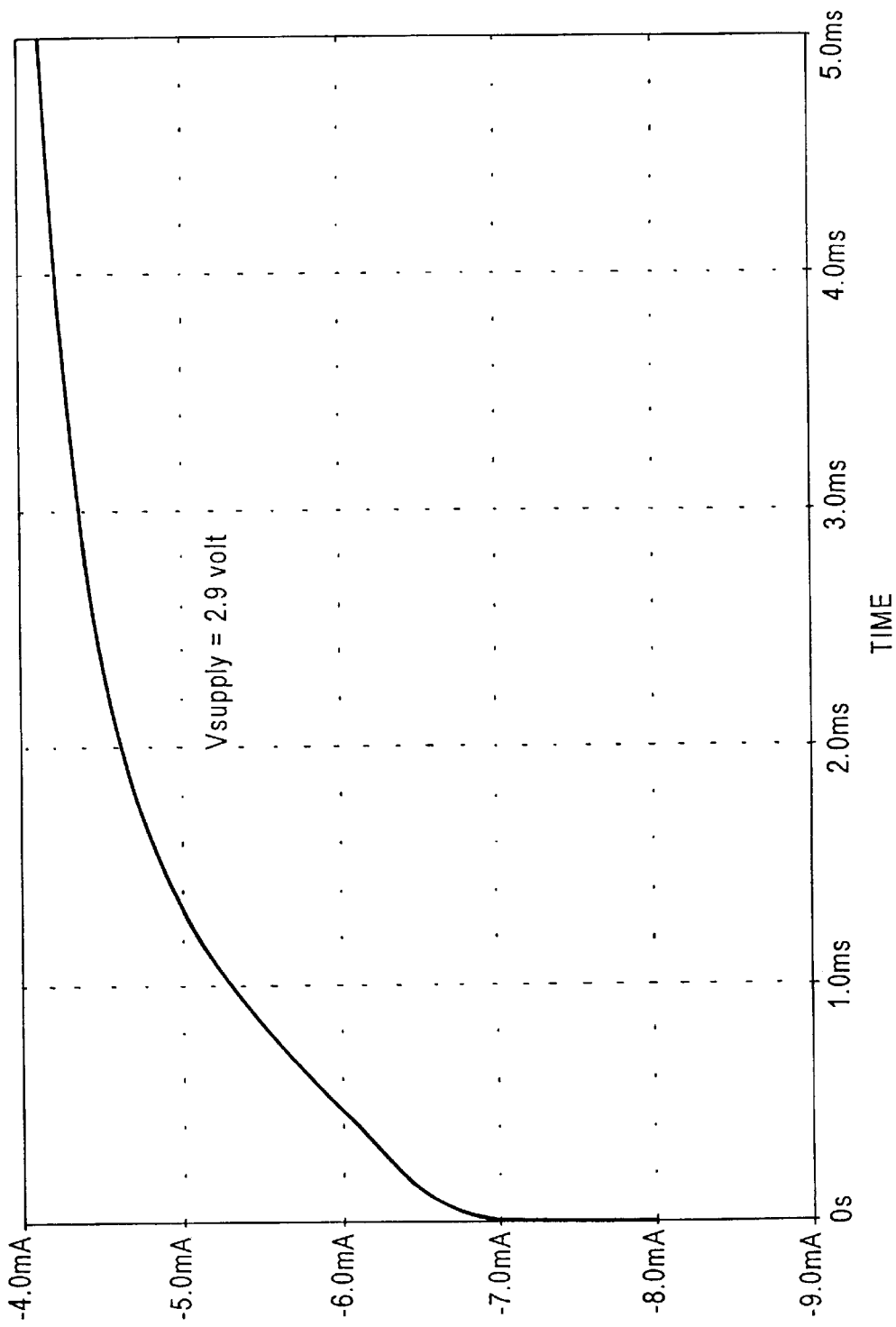
FIG. 4 illustrates the average supply current utilized generating the output characteristic of FIG. 3.

Referring now to FIGS. 3 and 4 therein is illustrated the output voltage characteristic of the embodiment of FIG. 2, as well as the average current consumption thereof with a supply voltage Vpos of 2.9 volts and a load resistance of 3.5 k.

Figure 5:
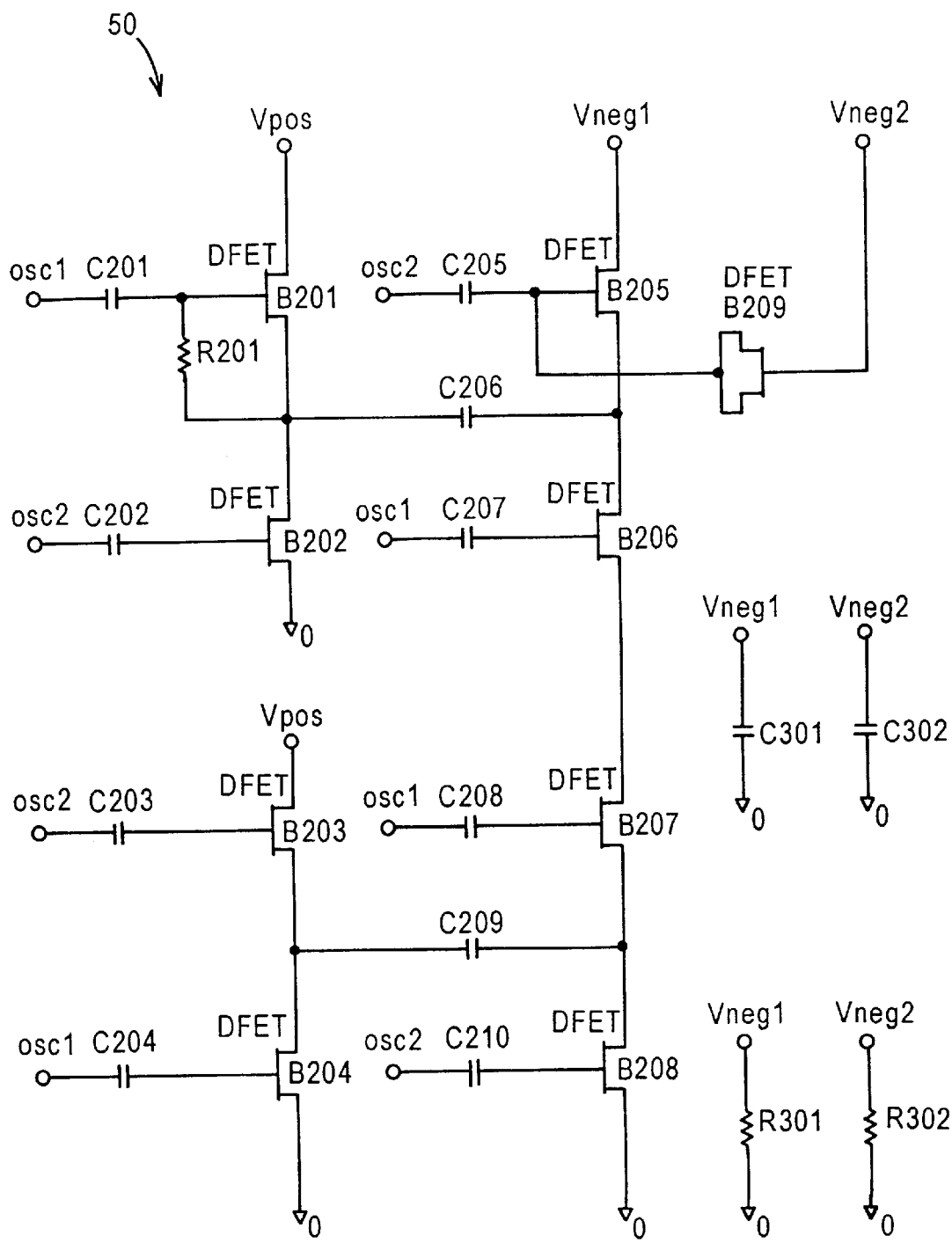
FIG. 5 illustrates a second embodiment of a series aiding dual charge pump utilized according to the present invention.

Referring now to FIG. 5, therein is disclosed a second embodiment of the present invention. The primary difference between the circuit 50 illustrated therein and circuit 20 of FIG. 2 is the inclusion of diode connected transistor B209 having a gate coupled to a node Vneg2 and a source and drain coupled to the gate of transistor B205. The node Vneg2 is further coupled to a reference potential in parallel through capacitor C302 and resistor R302. Further, preferably C205 now has a value of 20 p, capacitor C302 has a value of 1 n and resistor R302 has a value of 2 meg. Using this configuration, a second supply voltage can be supplied for devices which require a greater potential such as a solid state transmit/receive switch as is illustrated in FIG. 6.

In operation, when the signal at osc1 is high, the level at the gates of B201, B206, B207 and B204 is high, and C206 takes on a charge. When the signal at osc2 is high, the level at the gates of B202 and B205 become high and the charge on C206 is inverted and pumped into the storage capacitor B301, this action completes a task of creating a negative voltage supply. Simultaneously, the gates of B203 and B208 become high, and C209 takes on a charge. When the signal at osc1 becomes high again, the gates of B204 and B207 become high and consequently C209 is inserted in a series aiding connection into the charge path of C206 causing C206 to be charged to a voltage that is greater than the positive supply voltage.

In addition to the above-mentioned circuit activity, a second negative supply with an even greater output potential can be created by properly sizing the capacitor C205 with the addition of B209 as a rectifier connected to capacitor C302.

Figure 6:
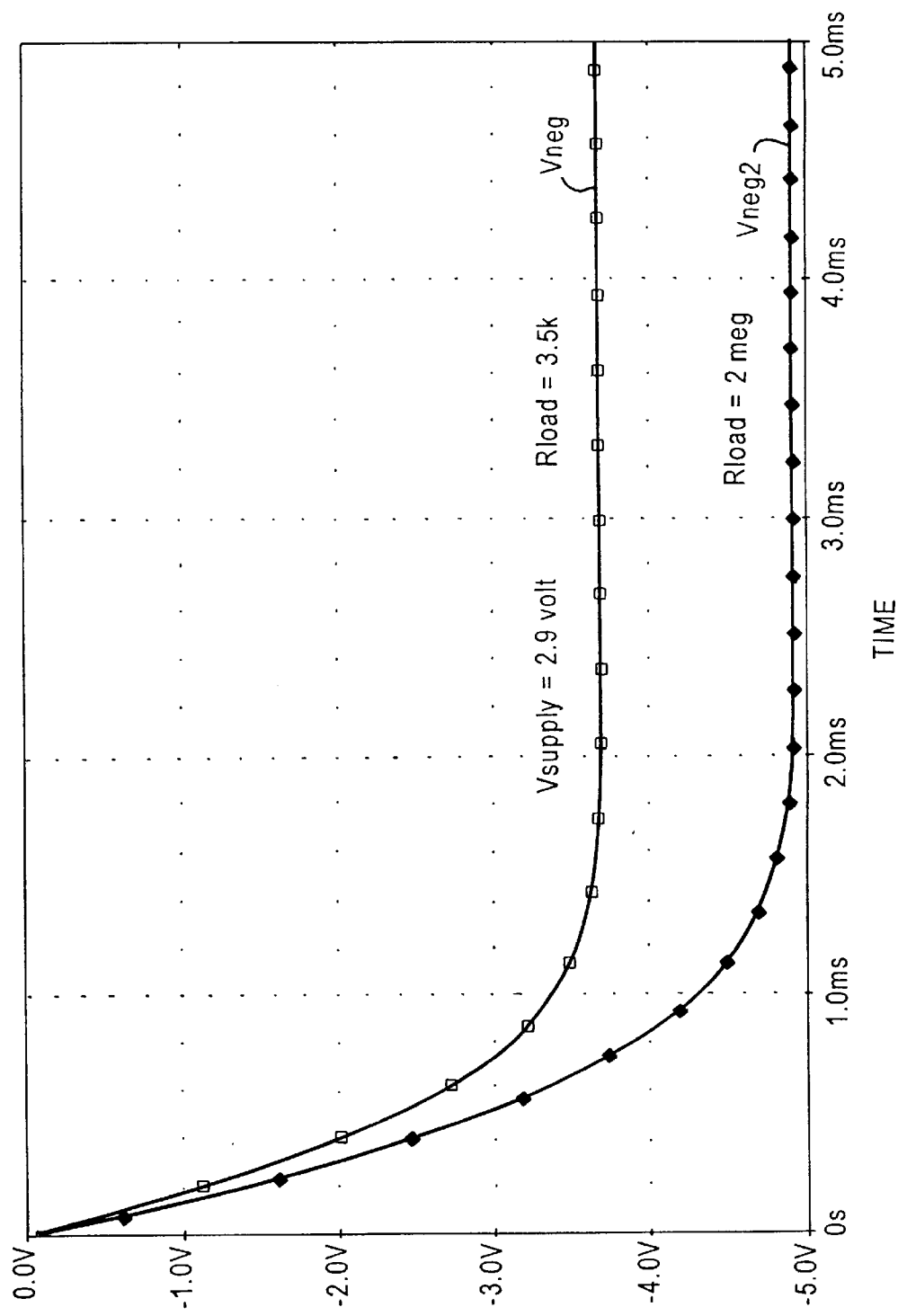
FIG. 6 illustrates the output characteristics of the embodiment of the present invention illustrated in FIG. 5.
Figure 7:
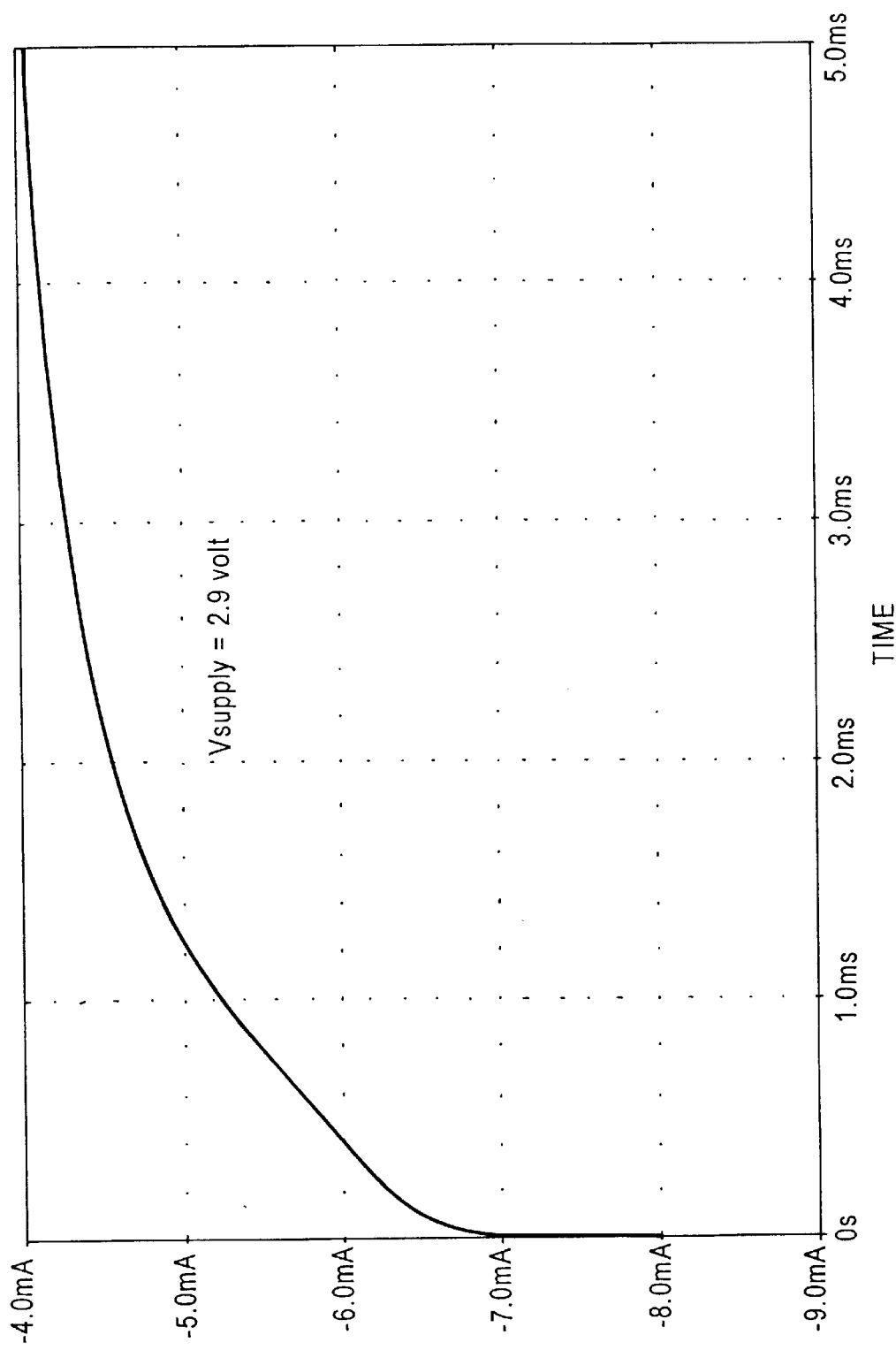
FIG. 7 illustrates the average supply current utilized generating the output characteristic of FIG. 6.

Referring now to FIGS. 6 and 7 therein is illustrated the output voltage characteristic of the preferred embodiment of circuit of FIG. 5, as well as the average current consumption thereof with a supply voltage Vpos of 2.9 volts and a load resistor of 3.5 k across Vneg and a load resistance of 2 meg across Vneg2.

Figure 8:
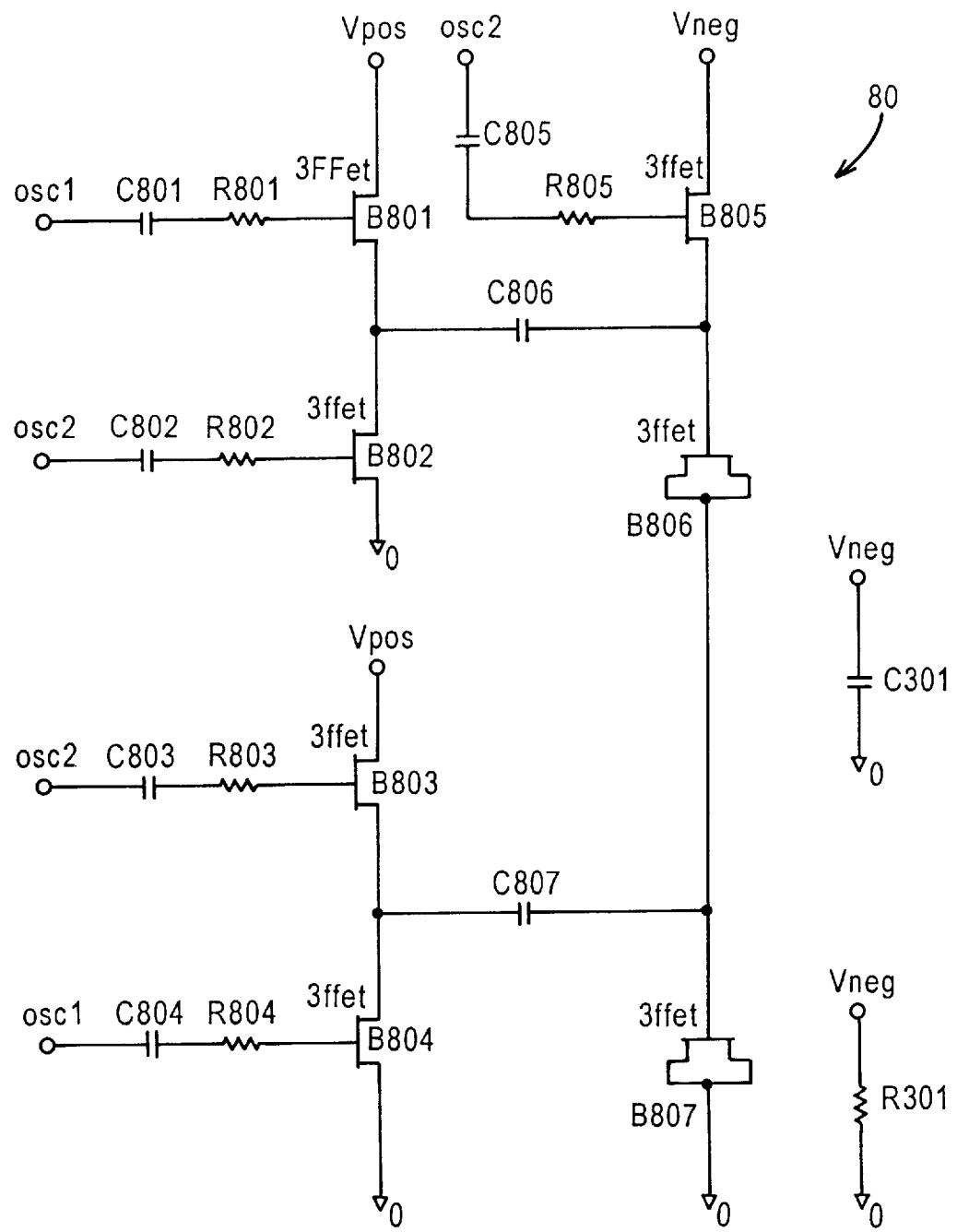
FIG. 8 illustrates a third embodiment of a series aiding dual charge pump utilized according to the present invention.

Referring now to FIG. 8, therein is disclosed a circuit 80 which illustrates a third embodiment of the present invention.

Therein, the first oscillation signal provided by the multivibrator 10 (osc1) is supplied to a capacitor C801 which is serially coupled through a resistor R801 to the gate of a transistor B801. The drain of B801 is coupled to a supply voltage, for example the battery of a device in which the present invention has been integrated into, such as a cellular phone. The second oscillation signal provided by the multivibrator 10 (osc2) is supplied to a capacitor C802 which is serially coupled through a resistor R802 to the gate of a transistor B802 which has a drain coupled to the source of the transistor B801, and a source coupled to a reference potential.

The second oscillation signal provided by the multivibrator 10 (osc2) is further supplied to a capacitor C805 which is serially coupled through a resistor R805 to the gate of a transistor B805 having a drain coupled to a node Vneg, which is in turn coupled in parallel through a capacitor C301 and resistor R301 to a reference potential. Further a capacitor C806 is coupled, on a first side to the source of transistor B801 and drain of transistor B802, and on a second side the source of transistor B805.

The second oscillation signal provided by the multivibrator 10 (osc2) is further supplied to a capacitor C803 which is serially coupled through a resistor R803 to the gate of a transistor B803. The drain of B803 is coupled to a supply voltage, for example the battery of a device in which the present invention has been integrated into, such as a cellular phone. The first oscillation signal provided by the multivibrator 10 (osc1) is further supplied to a capacitor C804 which is serially coupled through a resistor R804 to the gate of a transistor B804 which has a source coupled to a reference potential, and a drain coupled to the source of the transistor B803.

A transistor B806 has a gate coupled to the source of the transistor B805, and hence the second side of the capacitor C806 as well, and a source and drain coupled to the gate of another transistor B807, which in turn has a drain and source coupled to a reference potential.

A capacitor C807 is coupled, on a first side to the source of transistor B803 and drain of transistor B804, and on the second side to the source and drain of transistor B806 and gate of transistor B807.

Preferably, C801–C805 are 2 p, R201–R205 are 1 k, C206 and C207 are 220 n, C301 is 1$\mu$, and R301 is 1 k. Further, transistors B201–B207 have a pinch off voltage of 1.6 volts. While, transistors B201, B203 and B205 are 240 micron in size, transistors B202 and B204 are 480 micron in size, and B206 and B207 are 24 micron in size. Such a sizing of the transistors allows for better pull down to reference as will be understood by those having ordinary skill in the art, which results in approximately a 0.5 to 0.7 volt improvement over a configuration using transistors all of the same size.

In operation, when the signal osc1 is high, the level at the gates of B801 becomes high and C206 takes on a charge through B801, B806 and B807. When the level at osc2 becomes high, the level at the gates of B802 and B805 become high and the charge on C806 is inverted and pumped into storage capacitor B301, this action completes the task of creating a negative voltage supply. Simultaneously, the level at the gate of B803 becomes high causing C807 to take on a charge through B803 and B807. When the level of the signal at osc1 becomes high again, the level at the gate of B804 becomes high and C804 is inserted and a series aiding connection into this charge path of C806 causing C806 to be charged to a voltage that is greater than the positive supply voltage.

Figure 9:
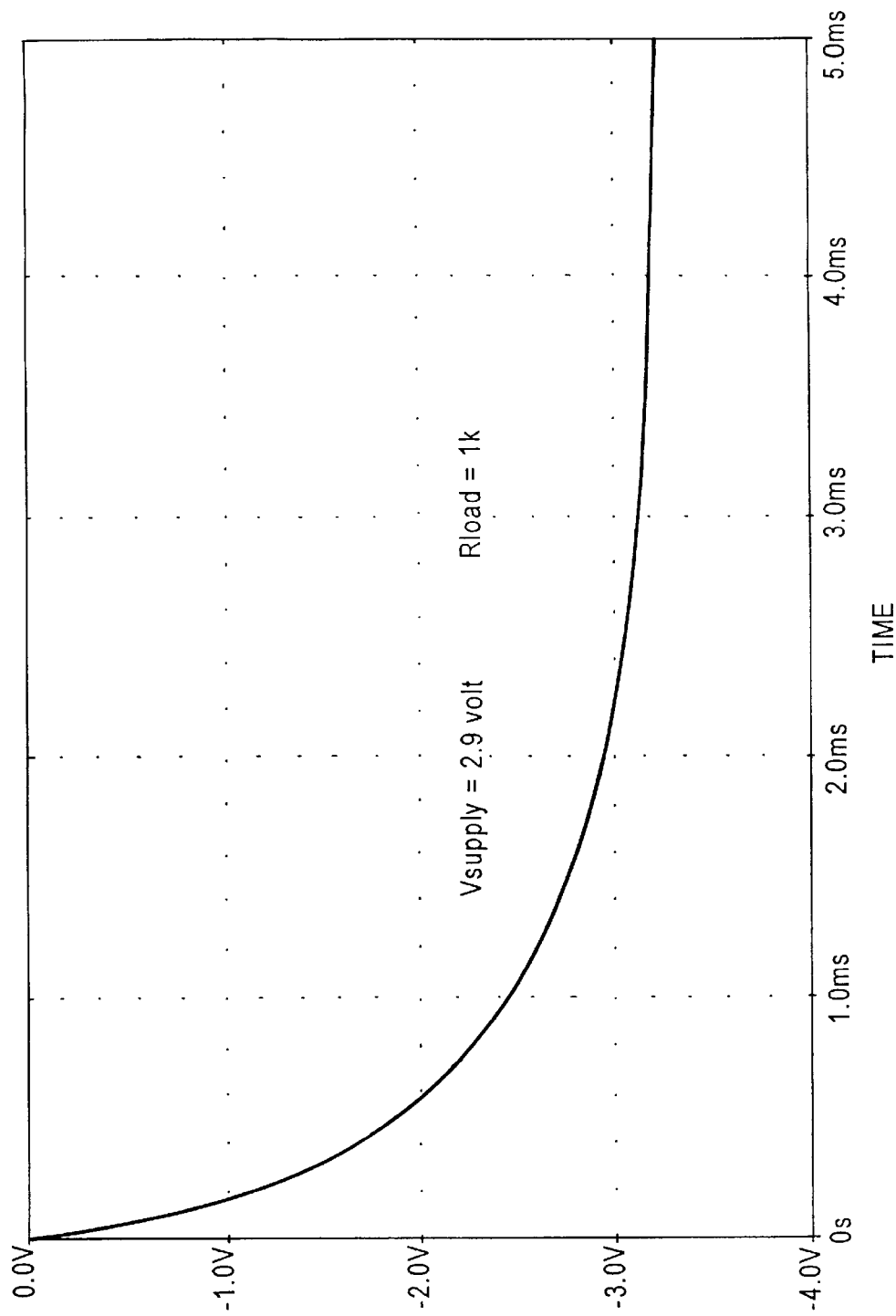
FIG. 9 illustrates the output characteristics of the embodiment of the present invention illustrated in FIG. 8.
Figure 10:
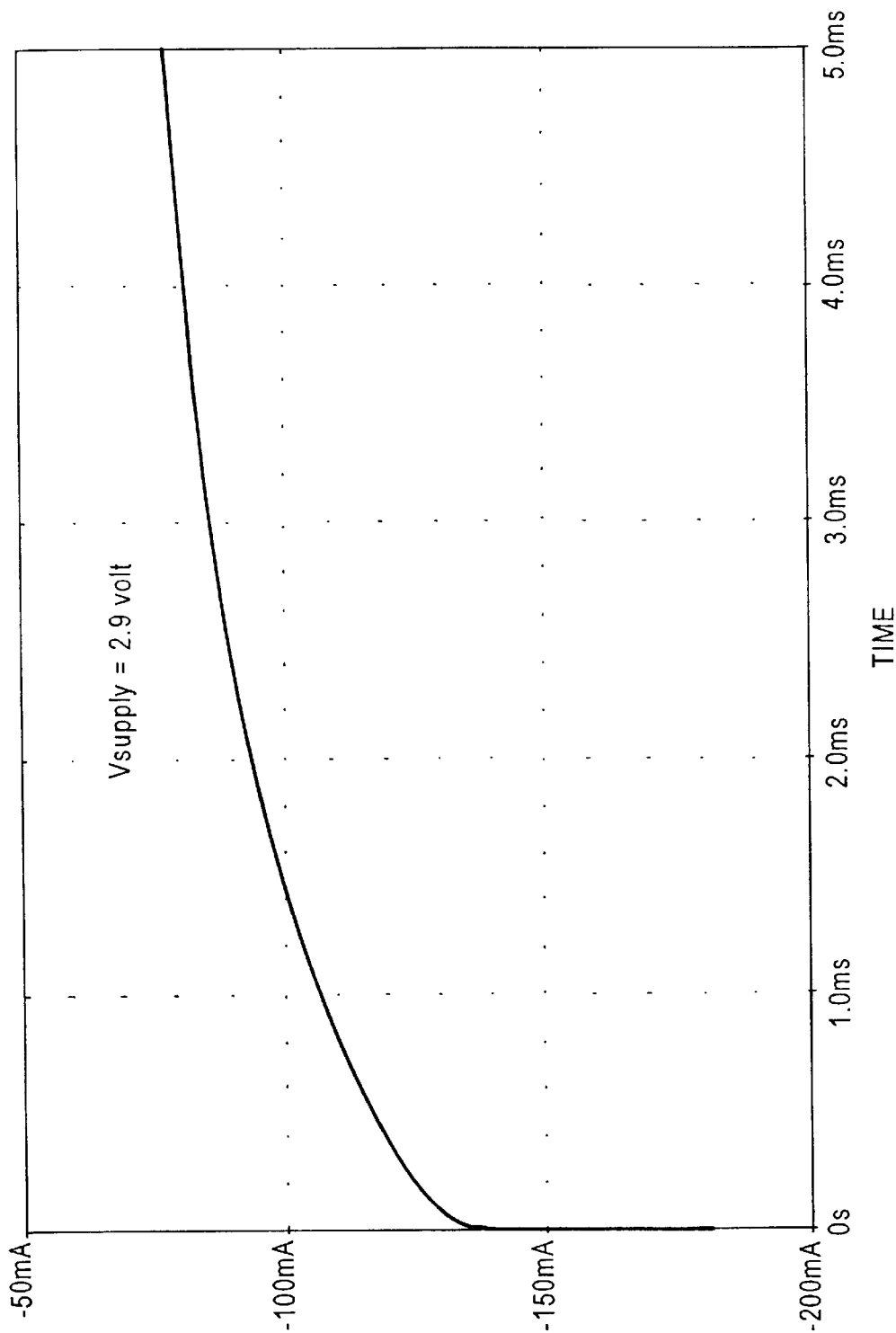
FIG. 10 illustrates the average supply current utilized generating the output characteristic of FIG. 9.

Referring now to FIGS. 9 and 10 therein is illustrated the output voltage characteristic of the preferred embodiment of circuit of FIG. 8, as well as the average current consumption thereof with a supply voltage of 2.9 v and a load resistance of 1F.

Figure 11:
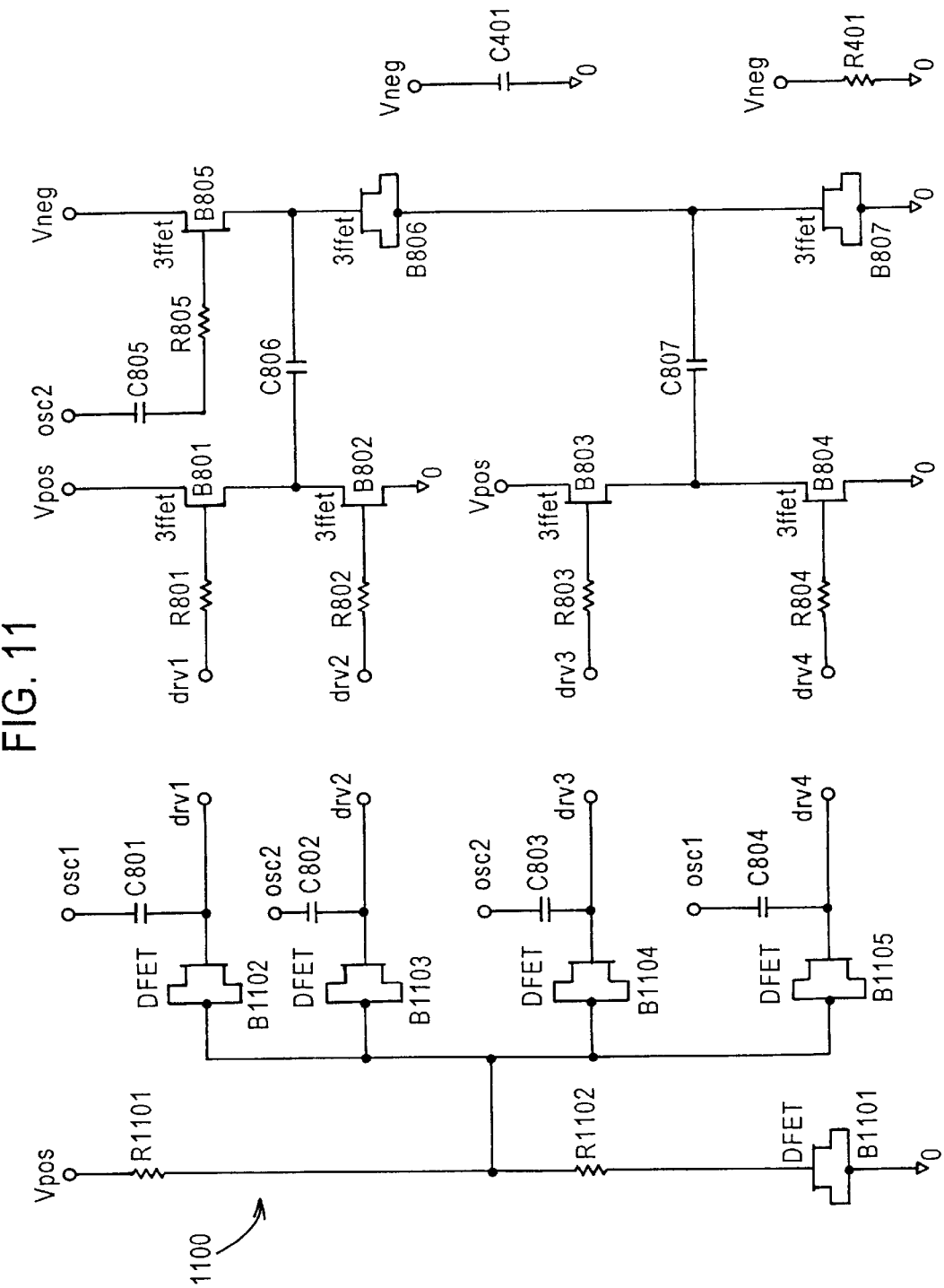
FIG. 11 illustrates a fourth embodiment of a series aiding dual charge pump utilized according to the present invention.

Referring now to FIG. 11, therein is illustrated circuit 1100 which represents a fourth embodiment of the present invention. The embodiment of FIG. 11 is seen to improve upon the embodiment of FIG. 8 by adding additional biasing circuitry which will now be described in further detail.

Therein, C801 is seen to additionally be coupled to the gate of a transistor B1102; C802 is seen to additionally be coupled to the gate of a transistor B1103; C803 is seen to additionally be coupled to the gate of a transistor B1104; and, C804 is seen to additionally be coupled to the gate of a transistor B1105. Transistors B1102–B1105 further each have their drains and sources coupled in parallel to the supply voltage Vpos through resistor R1101 and a reference potential through resistor R1102 and diode coupled transistor B1101 serially.

Such a configuration provides a pedestal voltage which prevents any of the voltages at nodes drv1–drv4 (respectively between C801 and R801–C804 and R804) from dropping too low which better biases the circuit of FIG. 8. Such a configuration results in a much lower current draw of the resulting circuit as is illustrated between FIGS. 10 and 13 ($\approx$80 ma vs. $\approx$30 ma). Further, transistor B1101 compensates for operating temperature changes due to heating of the elements resulting from operation. As a substrate having operating devices heats up, as is understood by those possessing ordinary skill in the art, any changes to the operating parameters of the devices thereon resulting from this heating will also occur to the transistor B1101. Accordingly, a device incorporating the embodiment of FIG. 11 has a very wide temperature range in which it can be successfully operated (for example, $-50$–$150°$ C.).

In operation the a stable multivibrator 10 when powered produces positive output pulses at the source connections of B101 and B103, these pulses are the charge pump drive signals and are called out as osc1 and osc2 as has been set forth. Elements B1101 through B1105, C1101 through C1104 and R1101 through R1102 are configured into a circuit that forms a temperature compensated synchronized bias supply. This circuit reduces supply current consumption by 60% and also eliminates the effects of reduced negative output voltage due to the increased gate leakage that occur in B801 through B804 when they operate at elevated temperatures. Elements B801 through B807, C801 and R801 through R805 are configured into a circuit that forms a series connected series aiding dual charge pump as illustrated and discussed regarding FIG. 8.

Elements numbered C802 and C803 are circuit elements that are alternatively charged for one-half cycle then connected to pump these charges into their respective loads on the non-charging one-half cycle. When the level at the gate of B801 is high, C802 takes on a charge through B801, B806 and B807. When the level at the gates of B802 and B805 are high, the charge on C802 is inverted and pumped into storage capacitor C401, this action completes the task of creating a negative voltage supply. Simultaneously, the gate of B803 is high and consequently C803 takes on a charge through B803 and B807. When the level at the gate of B804 becomes high corresponding to the osc1 oscillation signal again, C803 is inserted in a series aiding connection into the charge path of C802 causing C802 to be charged to a voltage that is greater than the positive supply voltage.

Figure 12:
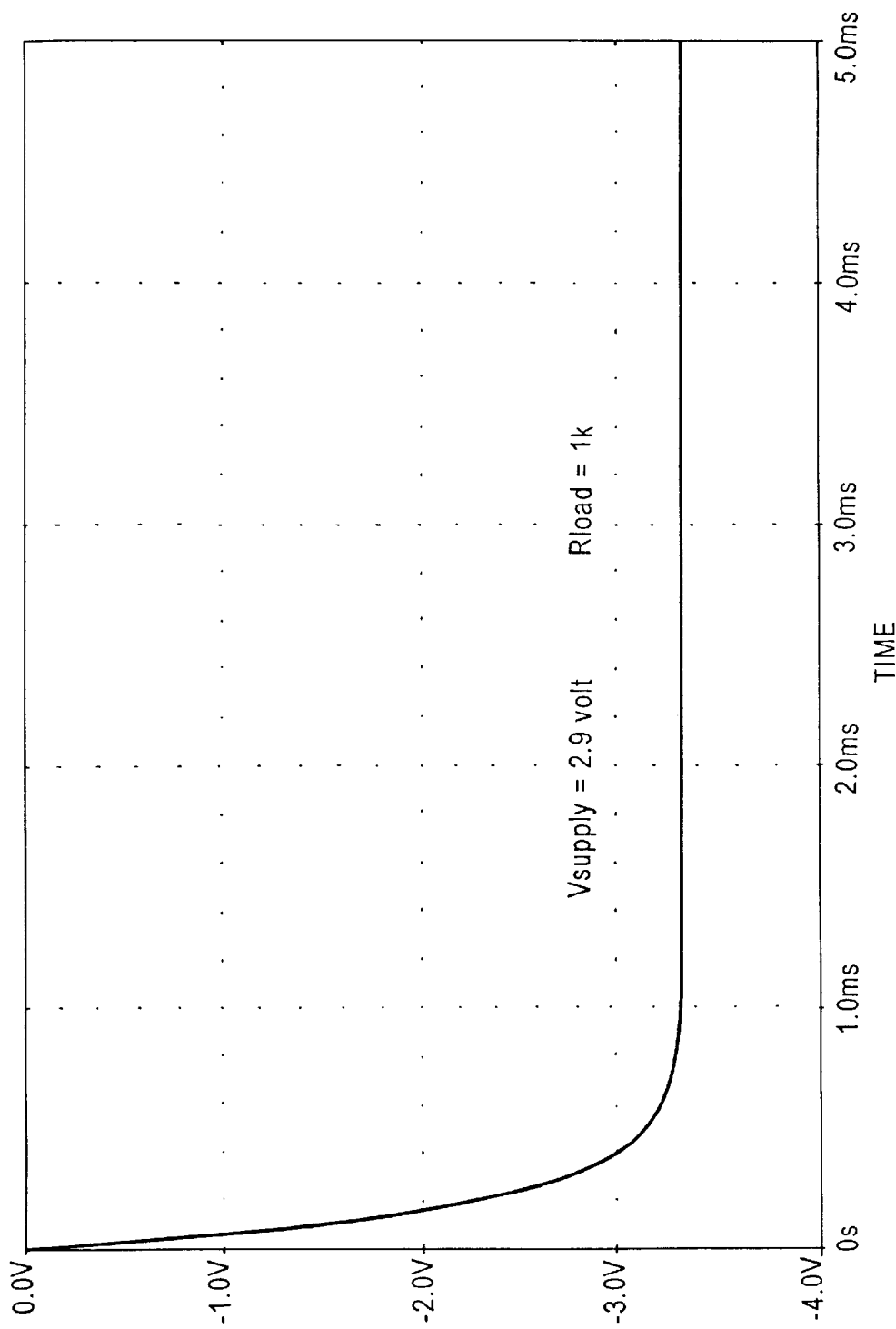
FIG. 12 illustrates the output characteristics of the embodiment of the present invention illustrated in FIG. 11.
Figure 13:
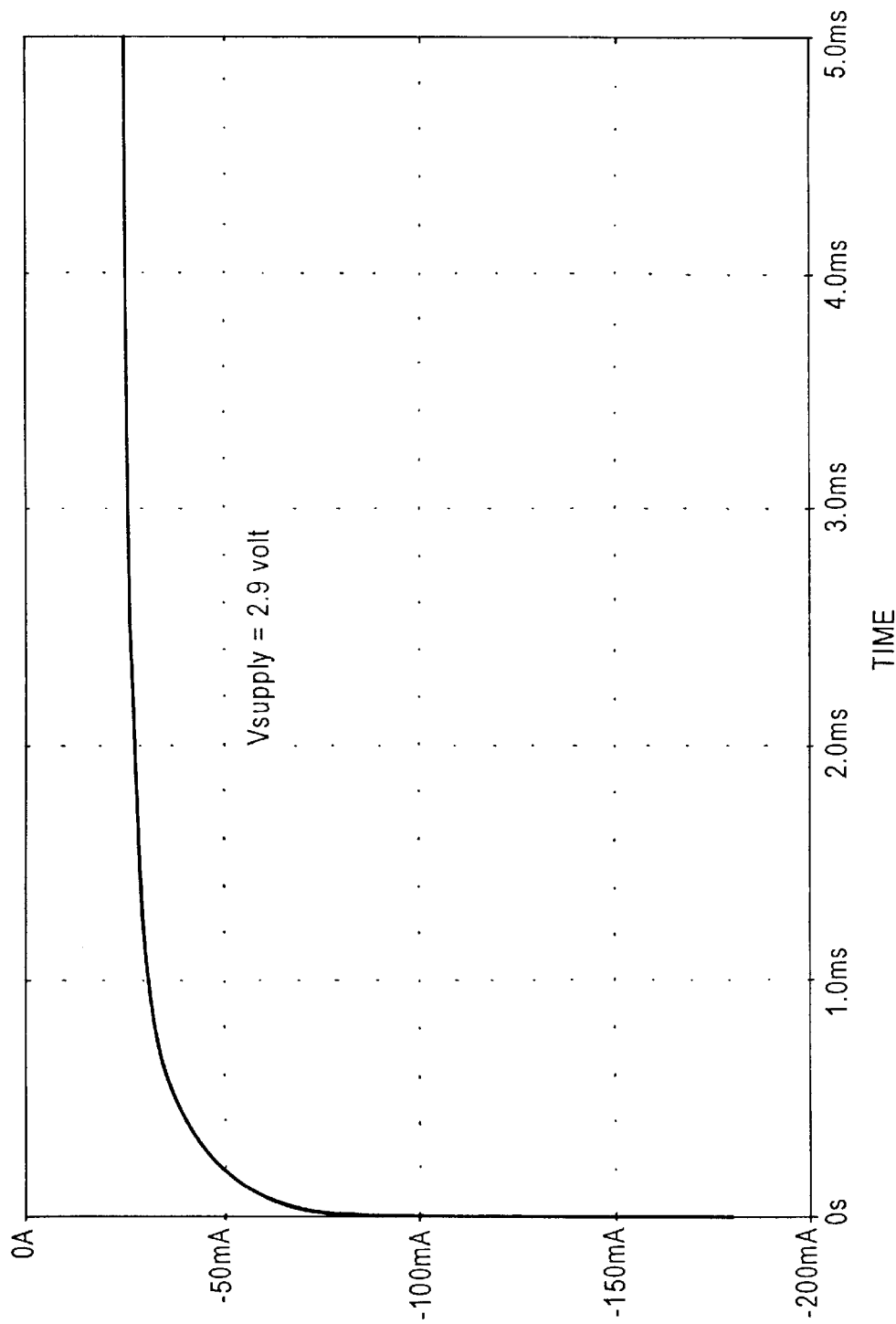
FIG. 13 illustrates the average supply current utilized generating the output characteristic of FIG. 12.

Referring now to FIGS. 12 and 13, therein is illustrated the output voltage characteristic of the embodiment of FIG. 11, as well as the average current consumption thereof with a supply voltage Vpos of 2.9 volts and a load resistance of 1 k.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I claim:

1. A voltage converter for a portable electronic device comprising:

an oscillator circuit for providing first and second control signals;

first and second capacitors;

a first switching circuit for charging said first capacitor in a first mode responsively to said first control signal;

a second switching circuit for charging said second capacitor in a second mode responsively to a second control signal;

wherein said first and second switching circuits are further adapted to enable charging of said first capacitor in a third mode with aid of said second capacitor to a greater potential than in said first mode.

2. The device of claim 1, wherein said first and second control signals are 180° out-of-phase oscillating signals.

3. The device of claim 1, wherein said first switching circuit comprises a first plurality of transistors, each being coupled such that said first capacitor is coupled between a given potential and ground responsively to said first control signal.

4. The device of claim 3, wherein said second switching circuit comprises a second plurality of transistors, each being coupled such that said second capacitor is coupled between said given potential and ground responsively to said second control signal.

5. The device of claim 4, wherein said first and second pluralities of transistors are further coupled such that said second capacitor enables said first capacitor to be charged to a greater potential responsively to said first control signal.

6. A voltage converter for a portable electronic device comprising:

an oscillator circuit for proving first and second control signals;

first and second capacitors;

a first switching circuit for charging said first capacitor responsively to the first control signal;

a second switching circuit for charging said second capacitor responsively to the second control signal;

wherein said first and second switching circuits are further adapted to enable charging of said first capacitor to a greater potential than said first switching circuit alone; and wherein said first switching circuit comprises:

a first transistor having a gate note adapted for receiving said first control signal, a second node coupled to a given potential and a third node coupled to said first capacitor;

a second transistor having a gate node adapted for receiving said first control signal, a second node coupled to said first capacitor and a third node;

a third transitor having a gate node adapted for receiving said first control signal, a second node coupled to said third node of said second transistor, and a third node coupled to said second capacitor; and a fourth transistor having a gate node adapted for receiving said first control signal, a second node coupled to said second capacitor and a third node coupled to ground.

7. The device of claim 6, wherein said second switching circuit comprises:

a fifth transistor having a gate note adapted for receiving said second control signal, a second node for providing an output, and a third node coupled to said first capacitor;

a sixth transistor having a gate node adapted for receiving said second control signal, a second node coupled to said first capacitor and a third node coupled to ground;

a seventh transistor having a gate node adapted for receiving said second control signal, a second node coupled to said given potential and a third node coupled to said second capacitor; and an eighth transistor having a gate node adapted for receiving said second control signal, a second node coupled to said second capacitor and a third node coupled to ground.

8. The device of claim 7, further comprising a ninth transistor having a gate node coupled to a second output and second and third nodes coupled to said second control signal.

9. A voltage converter for a portable electronic device comprising:

an oscillator circuit for proving first and second control signals;

first and second capacitors;

a first switching circuit for charging said first capacitor responsively to a first control signal;

a second switching circuit for charging said second capacitor responsively to a second control signal;

wherein said first and second switching circuits are further adapted to enable charging of said first capacitor to a greater potential than said first switching circuit alone; and wherein said first switching circuit comprises:

a first transistor having a gate note adapted for receiving said first control signal, a second node coupled to a given potential and a third node coupled to said first capacitor;

a second transistor having a gate node coupled to said first capacitor and second and third nodes;

a third transitor having a gate node coupeld to the second and third nodes of said second transistor and second and third nodes coupled to ground; and a fourth transistor having a gate node adapted for receiving said first control signal, a second node coupled to said second capacitor and a third node coupled to ground.

10. The device of claim 9, wherein said second switching circuit comprises:

a fifth transistor having a gate note adapted for receiving said second control signal, a second node coupled to said first capacitor and a third node coupled to ground;

a sixth transistor having a gate node adapted for receiving said second control signal, a second node coupled to said given potential and a third node coupled to said first capacitor;

a seventh transitor having a gate node adapted for receiving said second control signal, a second node coupled to said given potential and a third node coupled to said second capacitor.

11. The device of claim 10, wherein said second capacitor is further coupled to said second and thid nodes of said second transistor and said gate node of second transistor is further coupled to said third node of said sixth transistor.

12. The device of claim 11, wherein said second capacitor is further coupled to said gate node of said third transistor.

13. The device of claim 10, further comprising a biasing circuit, said biasing circuit comprising:

an eighth transistor having a gate node coupled to said gate node of said first transistor and second and third nodes;

a ninth transistor having a gate node coupled to said gate node of said fifth transistor and second and third nodes;

a tenth transistor having a gate node coupled to said gate node of said seventh transistor and second and third nodes;

an eleventh transistor having a gate node coupled to said gate node of said fourth transistor and second and third nodes;

wherein, said second and third nodes of said eighth, ninth, tenth and eleventh transistors are each coupled in parallel to said given potential and to ground.

14. The device of claim 13, further comprising temperature compensation means, said temperature compensation means comprising a twelfth transistor coupled between said second and third nodes of each of said eighth, ninth, tenth and eleventh transistors and ground.

15. A method for providing a supply potential comprising the steps of:

providing first and second oscillating signals being 180° out of phase with one another; and, in a first mode, charging first capacitive means responsively to said first oscillation signal;

in a second mode, charging said second capacitive means responsively to said second signal; and, in a third mode, charging said first capacitive means with the aid of said second capacitive means to a potential greater than in said first mode.

16. A voltage converter for an electronic device having a limited supply voltage, said converter comprising:

oscillating means for providing first and second 180° out-of-phase, oscillating, control signals;

a first plurality of transistors series coupled between said supply voltage and a reference potential;

a second plurality of transistors series coupled between said supply voltage and a reference potential;

a third plurality of transistors series coupled between an output node and said reference potential;

first capacitive means coupled between said first plurality of transistors and said third plurality of transistors; and, second capacitive means coupled between said second plurality of transistors and said third plurality of transistors;

wherein, in a first mode said first, second and third pluralities of transistors enable charging of said first capacitive means to a first voltage responsively to said first control signal;

wherein, in a second mode said first, second and third pluralities of transistors enable charging of said second capacitive means to a second voltage responsively to said second control signal; and, wherein, in a third mode said first, second and third pluralities of transistors enable charging said first capacitive means to a third voltage responsively to said first control signal;

wherein said first and second voltage are less than said limited supply voltage, and said third voltage is greater than said limited supply voltage.

17. The device of claim 16, wherein said first capacitive means has:

a first electrode coupled to each of said first plurality of transistors; and, a second electrode coupled to at least two of said third plurality of transistors.

18. The device of claim 17, wherein said second capacitive means has:

a first electrode coupled to each of said second plurality of transistors; and, a second electrode coupled to at least two of said third plurality of transistors.

19. The device of claim 18, further comprising biasing means for biasing inputs of each of said first and second pluralities of transistors, said biasing means comprising:

a fourth plurality of transistors, each of said fourth plurality of transistors having and coupled to an associated transistor selected from said first and second pluralities, and being coupled to said limited supply voltage and said reference potential.

20. The device of claim 19, further comprising temperature compensation means coupled between said fourth plurality of transistors and said reference potential for compensating for temperature changes.

* * * * *